US007582350B2

(12) United States Patent
Kaposi

(10) Patent No.: US 7,582,350 B2

(45) Date of Patent: *Sep. 1, 2009

(54) MULTI-OPENER DEVICE

(75) Inventor: Sascha Kaposi, Tacoma, WA (US)

(73) Assignee: Progressive International Corporation, Kent, WA (US)

( * ) Notice: Subject to any disclaimer, the term of this patent is extended or adjusted under 35 U.S.C. 154(b) by 468 days.

This patent is subject to a terminal disclaimer.

(21) Appl. No.: 11/386,164

(22) Filed: Mar. 22, 2006

(65) Prior Publication Data

US 2006/0216472 A1 Sep. 28, 2006

Related U.S. Application Data

(60) Provisional application No. 60/664,439, filed on Mar. 22, 2005.

(51) Int. Cl.

*B32B 3/24* (2006.01)

*B67B 7/44* (2006.01)

(52) U.S. Cl. ........................................ 428/134; 81/3.44

(58) Field of Classification Search ................. 428/134; 81/3.44

See application file for complete search history.

(56) References Cited

U.S. PATENT DOCUMENTS

| | | | | |
|---|---|---|---|---|
| 1,806,828 | A | 5/1931 | Servaas | |
| 2,131,395 | A * | 9/1938 | Voss | 81/3.56 |
| 2,651,226 | A * | 9/1953 | Hopmann | 81/3.09 |
| 4,179,954 | A | 12/1979 | Whalen | |
| 6,263,761 | B1 * | 7/2001 | Ryder | 81/3.09 |
| D538,119 | S * | 3/2007 | Kaposi | D8/40 |
| 2002/0069729 | A1 | 6/2002 | Anderson et al. | |

* cited by examiner

*Primary Examiner*—William P Watkins, III

(74) *Attorney, Agent, or Firm*—Black Lowe & Graham, PLLC

(57) ABSTRACT

A container opening tool includes first and second legs hingedly secured to one another. Each leg has proximal and distal portions each having an aperture wall including a gripping material. The aperture walls form of the first and second legs are positionable to form proximal and distal apertures. The aperture walls of the distal portions define an elongate aperture, such as an oval or ellipse. Bottle opening flanges secure to the first and second legs and project into the proximal aperture. When the legs are pivoted together, the flanges are positioned adjacent one another and function as a single bottle opener. A blade secures to the second leg near the distal end positioned within a recess formed proximate the distal end of the second leg. A projection is formed on the distal end of the first leg and positionable proximate the blade to press a bag against the blade.

19 Claims, 4 Drawing Sheets

MULTI-OPENER DEVICE

PRIORITY CLAIM

This application claims the benefit of provisional application Ser. No. 60/664,439, filed Mar. 22, 2005, which is hereby incorporated by reference.

FIELD OF THE INVENTION

This invention relates generally to package opening devices, particularly including devices capable of opening a wide variety of packages, including bottles, cans, jars and bags.

BACKGROUND OF THE INVENTION

Many bottles, cans, and bags are tightly sealed and can be difficult to open. A typical household includes a variety of different devices for opening, including can openers, bottle openers, scissors, and special gripping devices. While each such device can be useful for its particular purpose, it would be better if a single device could perform the function of many different devices, eliminating the need for several devices while providing improved opening functions at the same time.

SUMMARY OF THE INVENTION

A container opening tool includes first and second legs hingedly secured to one another. Each leg has proximal and distal portions each having an aperture wall including a gripping material. The aperture walls of the proximal portions of the first and second legs form a proximal aperture and the aperture walls of the distal portions of the first and second legs are positionable to form a distal aperture. The proximal and distal apertures may have differing sizes and shapes. In one embodiment, the aperture walls of the distal portions define an elongate aperture, such as an oval or ellipse, with the first and second legs contacting each other near the major axis of the elongate shape. A projection may secure to an arcuate outer surface formed on the first leg and extend substantially tangentially from the outer surface. The projection is engageable with pull tabs of containers in order to lift the pull tabs upon pivoting the container opening tool relative to the container.

Bottle opening flanges secure to the first and second legs and project into the proximal aperture. When the legs are pivoted together, the flanges are positioned adjacent one another and function as a single bottle opener. The bottle opening flanges secure to the legs at the edge of the aperture walls such that a lid can be positioned within the proximal aperture having the flanges resting on the lid to aid in positioning the opening tool on the lid. In a like manner, skirts secure to the edges of the aperture walls of the distal portions and provide a surface engaging the top of a lid being opened.

The first and second legs each include a junction positioned between the proximal and distal ends. The junctions join the proximal and distal portions and include a gripping surface. The gripping surfaces of the junctions are placed in contact with one another when the legs are pivoted together in order to grip items such as safety seals covering container openings.

A blade secures to the second leg near the distal end. The distal ends of the legs are pressed together around a bag and the bag moved relative to the blade in order to cut an opening in the bag. In one embodiment, the blade is positioned within a recess formed proximate the distal end of the second leg. A projection is formed on the distal end of the first leg and positionable proximate the blade to press a bag against the blade.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
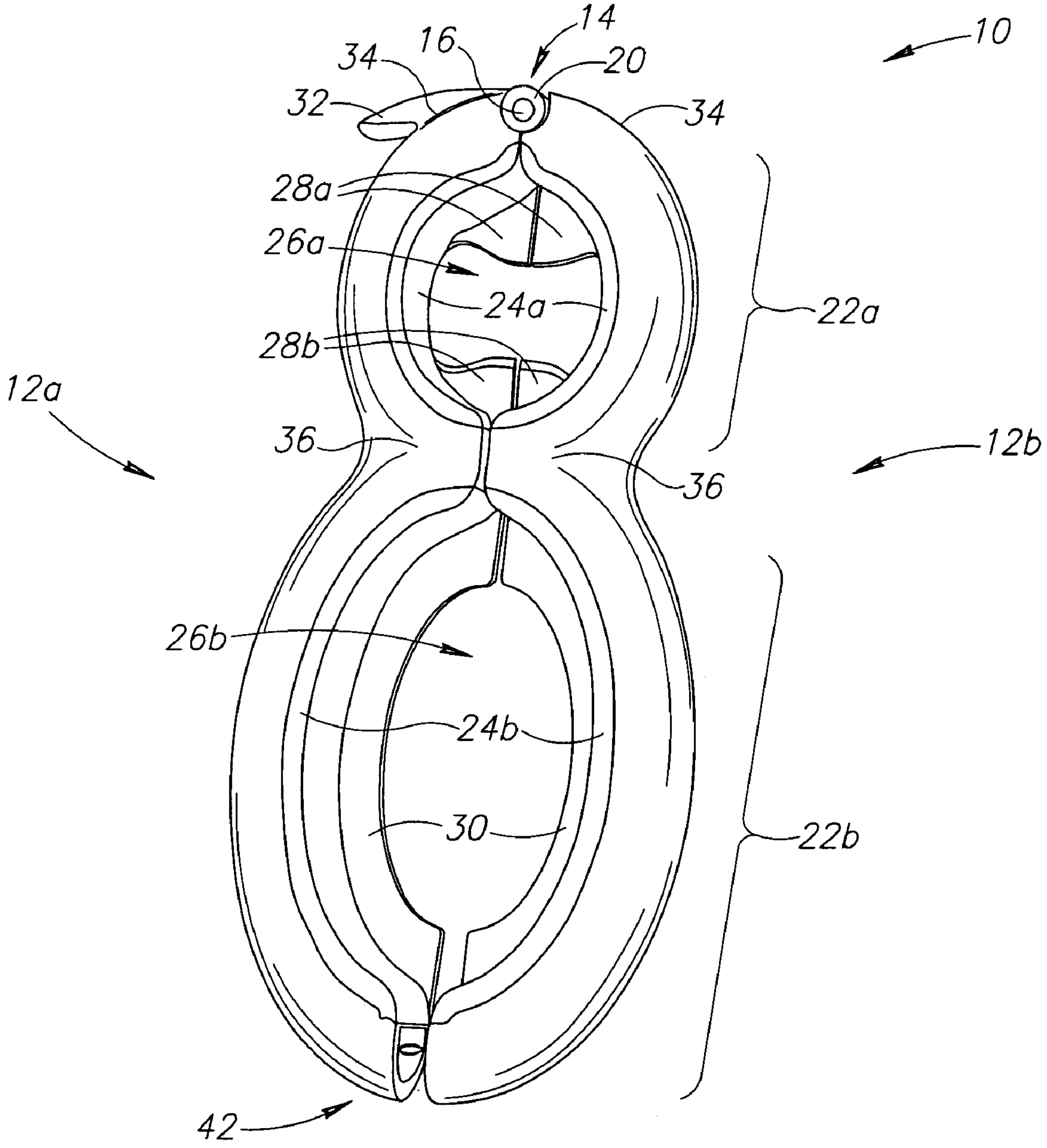
FIG. 1 is a perspective view of a container opening tool, in accordance with an embodiment of the present invention.
Figure 2B:
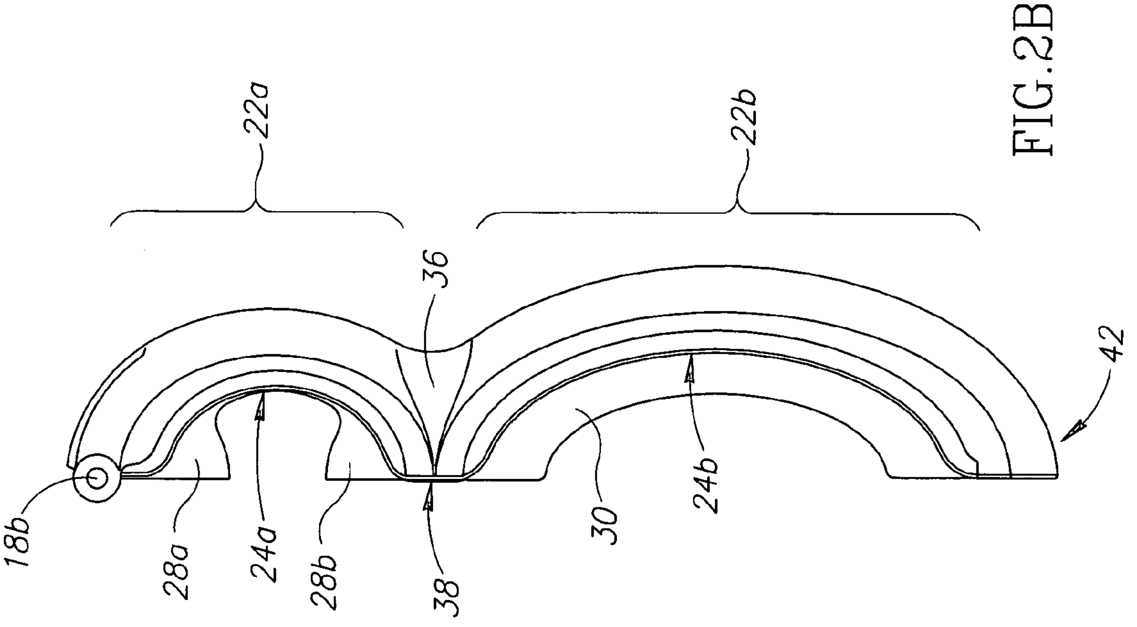
FIG. 2B is a top plan view of a second leg of the container opening tool of FIG. 1.
Figure 2A:
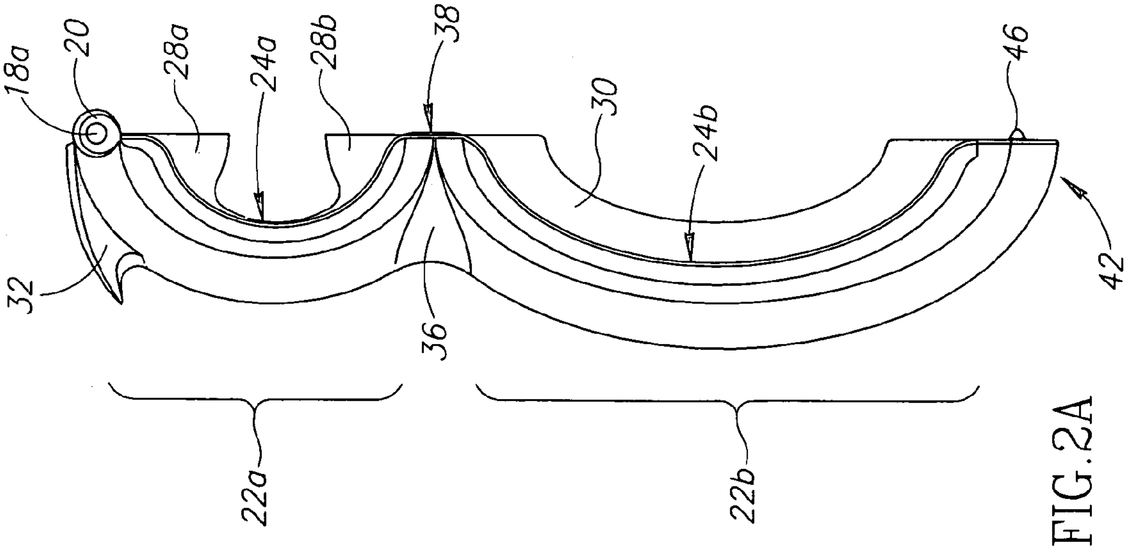
FIG. 2A is a top plan view of a first leg of the container opening tool of FIG. 1.

Referring to FIGS. 1, 2A, and 2B, a container opening tool 10 includes a first leg 12*a* and a second leg 12*b* pivotally secured to one another by means of a pivot 14. The legs 12*a*, 12*b* are formed of a rigid material such as plastic, aluminum, steel, or the like. The legs 12*a*, 12*b* may also have an outer cover made of natural or synthetic rubber that provides cushioning and gripability to the user. The pivot 14 may be embodied as a pin 16 positionable within apertures 18*a*, 18*b* formed in the legs 12*a*, 12*b*. The aperture 18*a* in the leg 12*a* may be formed in two arms 20 positioned on either side of the portion of the leg 12*b* having the aperture 18*b* formed therein. The legs 12*a*, 12*b* include proximal and distal portions 22*a*, 22*b* each having an aperture wall 24*a*, 24*b*. The apertures walls 24*a*, 24*b* of the legs 12*a*, 12*b* are positionable adjacent one another to form proximal and distal apertures 26*a*, 26*b*.

The aperture walls 24*a*, 24*b* may be formed of a grippable material such that the legs 12*a*, 12*b* can be positioned around a lid or other structure to facilitate twisting. The aperture walls 24*a*, 24*b* may be formed of a material different than the material covering other parts of the tool 10 such that the aperture walls 24*a*, 24*b* are better suited for gripping lids. In the illustrated embodiments, the apertures 26*a*, 26*b* are of different sizes to accommodate differently sized lids. The aperture 26*b* may be embodied as an arcuate, elongate shape, such as an oval or ellipse, in order that the same aperture can readily grip lids of different sizes. The aperture walls 24*b* are typically portions of the elongate shape formed by dividing the elongate shape along its major axis. In this manner, when the legs 12*a*, 12*b* are closed, the length of the minor axis of the elongate shape is small enough to allow the legs 12*a*, 12*b* to close around small lids. The legs 12*a*, 12*b* may be expanded such that lids closer in size to the length of the major axis may also be gripped.

The legs 12*a*, 12*b* may have one or more bottle opener flanges 28*a*, 28*b* secured thereto and projecting outwardly from the aperture walls 24*a*. The flanges 28*a*, 28*b* of the legs 12*a*, 12*b* are positioned adjacent one another when the legs 12*a*, 12*b* are pivoted together to such that the combined flanges 28*a* and the combined flanges 28*b* each function as a conventional bottle opener flange suitable for opening bottles having crimped metal lids and the like.

In the illustrated embodiment, the flanges 28*a*, 28*b* are secured to the legs 12*a*, 12*b* near the edge of the aperture walls 24*a*. In this manner, the flanges 28*a*, 28*b* serve as stops, contacting the top of lids positioned between the legs 12*a*, 12*b* for gripping with the aperture walls 24*a*. A similar function may be provided by skirts 30 secured to the legs 12*b* along the edges of the aperture walls 24*b*. The skirts 30 and flanges 28*a*, 28*b* facilitate positioning of the apertures 26*a*, 26*b* around lids by encouraging the apertures to align with the rim of the lid such that the area of the aperture walls 24*a*, 24*b* in contact with the lid is substantially at its greatest possible extent.

A projection 32 secures to one of the legs 12*a*, 12*b* and facilitates opening of pull tab containers, such as canned beverages. In the illustrated embodiment, the projection 32 is wedge shaped and secures at its wide end to the leg 12*a* such that it projects substantially tangentially from the outer surface 34 of the leg 12*a*. The outer surface 34 of the leg 12*a* and an outer surface 34 of the leg 12*b* may together form a single arc. In use, the projection 32 can be positioned under a pull tab of a can with the legs 12*a*, 12*b* resting on the can proximate the pivot 14. The legs 12*a*, 12*b* may then be pivoted on the outer surfaces 34 such the projection 32 lifts the pull tab.

Figure 3:
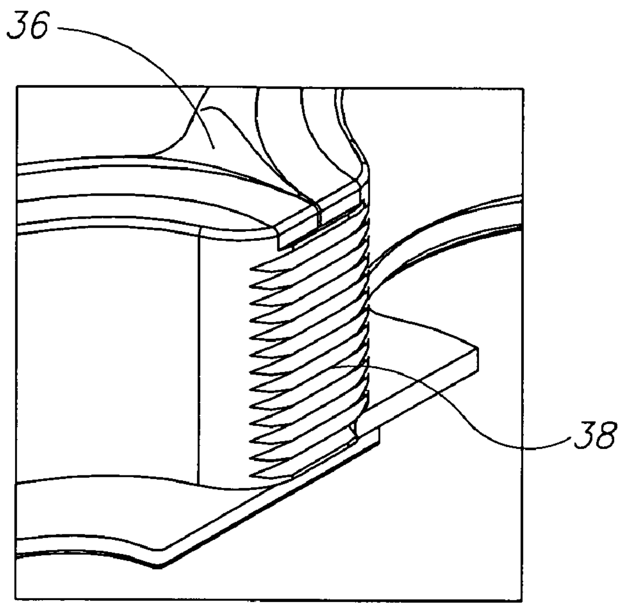
FIG. 3 is a perspective view of a gripping surface, in accordance with an embodiment of the present invention.

Referring to FIG. 3, while still referring to FIGS. 1, 2A, and 2B, the proximal and distal portions 22*a*, 22*b* of the first and second legs 12*a*, 12*b* are joined together at a junction 36. The junction 36 may include a gripping surface 38 such that the gripping surfaces of the legs 12*a*, 12*b* are in contact when the legs 12*a*, 12*b* are pivoted against one another. The gripping surface 38 may include texturing such as a series of parallel grooves and is typically formed of a gripping material such as a natural or synthetic rubber. The gripping surfaces 38 may be used to grip such things as safety seals secured to bottle openings in order to facilitate removal.

Figure 4:
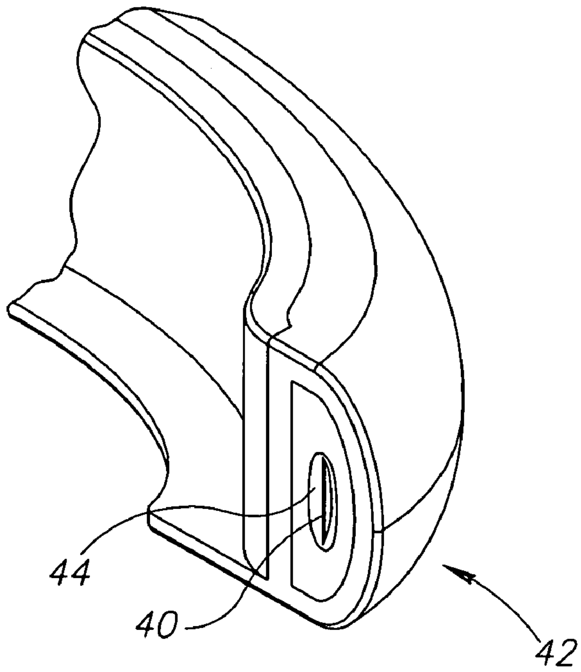
FIG. 4 is a perspective view of a distal end of the second leg having a blade secured thereto, in accordance with an embodiment of the present invention.
Figure 5:
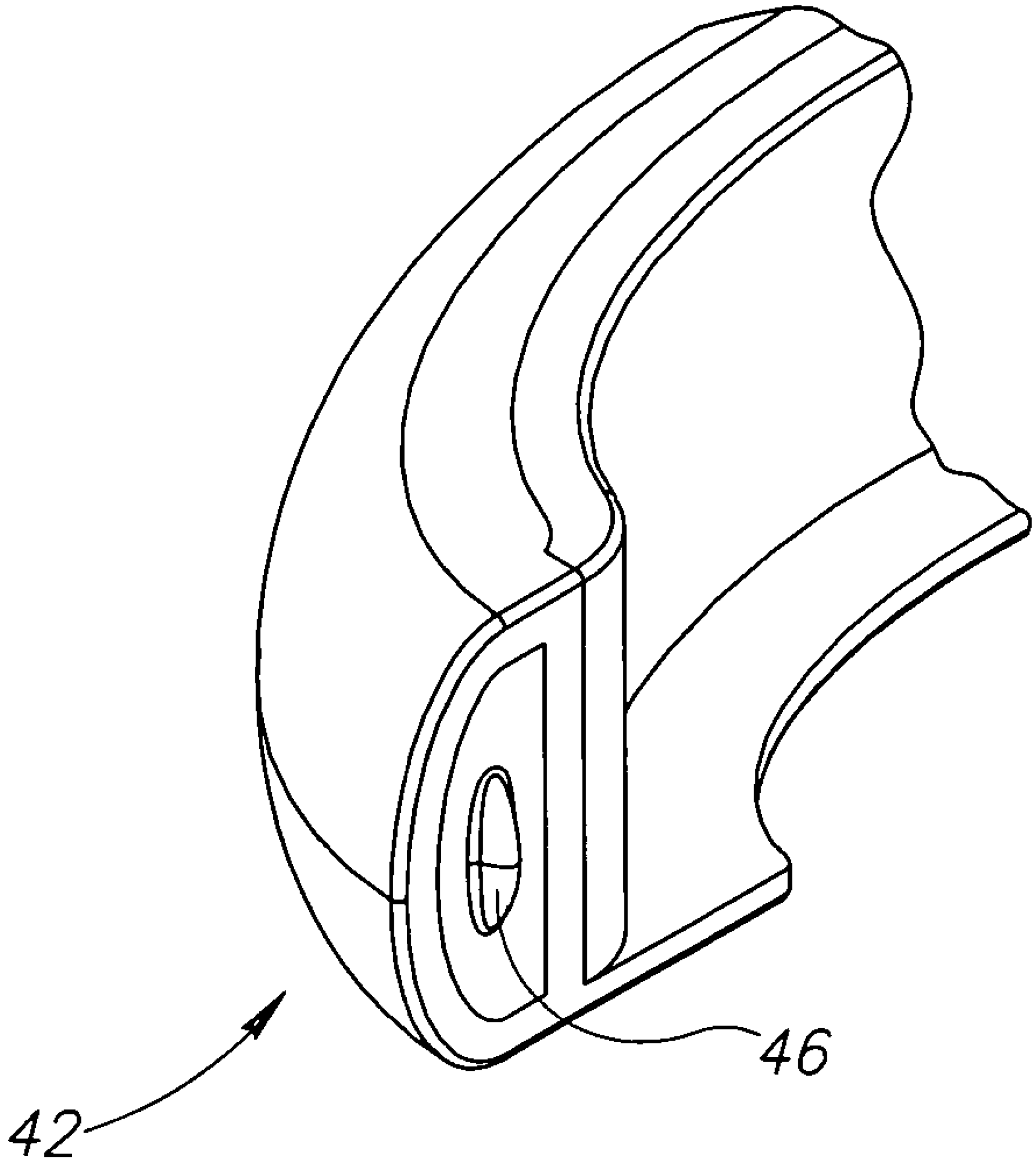
FIG. 5 is a perspective view of a distal end of the first leg having a projection secured thereto, in accordance with an embodiment of the present invention.

Referring to FIGS. 4 and 5, in one embodiment a blade 40 secures to the leg 12*b*, such as near a distal end 42 of the leg 12*a*, in order to cut open bags. In use, a bag is positioned between the distal end 42 of the leg 12*a* and a distal end 42 of the leg 12*b*. The distal ends 42 are pushed together and the bag is moved relative to the distal ends 42 such that the blade 40 cuts an opening in the bag.

In some embodiments, the blade 40 is positioned within a recess 44 formed near the distal end 42 of the leg 12*b*. The cutting edge of the blade 40 in such embodiments may be flush with, or below, the surface of the leg 12*b*. In such embodiments, a projection 46 may secure to the distal end 42 of the leg 12*a* and serve to press the bag against the blade 40. Recessed positioning of the blade 40 reduces the likelihood of injury through accidental contact and also hinders dulling of the blade 40 through contact with other cooking utensils in a storage drawer or dishwasher.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A container opening tool comprising:

first and second legs hingedly secured to one another, each leg comprising:

proximal and distal portions each having an inner aperture wall including a gripping material, the aperture walls of the proximal portions of the first and second legs positionable to form a proximal aperture and the aperture walls of the distal portions of the first and second legs positionable to form a distal aperture, the proximal and distal apertures having different sizes;

the first leg having an outer surface opposite the inner proximal aperture wall; and a projection secured to the outer surface and extending substantially tangentially from the outer surface to define an interior space between the projection and the outer surface.

2. The container opening tool of claim 1 wherein the proximal portions have first and second ends, the proximal portions pivotally securing to one another proximate the first ends, the distal portions securing to the proximal portions proximate the second ends.

3. The container opening tool of claim 1, wherein the distal aperture is an elongate arcuate shape having a major axis substantially longer than the proximal aperture, the aperture walls forming the distal aperture contacting one proximate the major axis of the elongate arcuate shape.

4. The container opening tool of claim 1, wherein the proximal portions have first and second ends, each of the proximal portions comprising a first metal flange secured proximate the first end and projecting away from the aperture wall, the first metal flanges of the proximal portions being adjacent one another when the proximal portions are positioned to form the proximal aperture.

5. The container opening tool of claim 4, each of the proximal portions further comprising a second metal flange secured proximate the second end of the proximal portion and projecting away from the aperture wall toward the first metal flange, the second metal flanges of the proximal portions being adjacent one another when the proximal portions are positioned to form the proximal aperture, wherein the metal flanges are secured proximate the edge of the aperture walls.

6. The container opening tool of claim 1, wherein the distal portion comprises a skirt secured along the entire inner aperture wall, the skirt defining a third aperture smaller than the distal aperture.

7. The container opening tool of claim 1, wherein the first and second legs each have distal and proximal ends, the first and second legs pivotally secured to one another proximate their proximal ends.

8. The container opening tool of claim 7, wherein the first and second legs each include a junction positioned between the proximal and distal ends, the junction joining the proximal and distal portions and comprising a gripping surface, the gripping surface being formed from a resilient material.

9. The container opening of tool of claim 8, wherein the gripping surface is planar and includes texturing.

10. The container opening tool of claim 7, wherein the second leg has a blade secured thereto proximate the distal end.

11. The container opening tool of claim 10, wherein the blade is positioned within a recess formed proximate the distal end of the second leg, the blade having a sharpened edge that is within the recess.

12. The container opening tool of claim 11, further comprising a projection formed on the distal end of the first leg, the projection being configured to abut the sharpened edge of the blade when the first and second legs are pivoted adjacent one another to form the distal aperture.

13. The container opening tool of claim 2, wherein the projection is secured to the outer surface at the first end of the first leg.

14. A container opening tool comprising:

first and second legs pivotally secured to one another, each leg comprising:

proximal and distal portions each having an inner aperture wall including a gripping material, the aperture walls of the proximal portions of the first and second legs positionable to form a proximal aperture and the aperture walls of the distal portions of the first and second legs positionable to form a distal aperture, the proximal and distal apertures having different sizes, the first leg having a first outer surface opposite the inner proximal aperture wall, the second leg having a second outer surface opposite the inner proximal aperture wall; and a first inner contact surface on the first leg and a second inner contact surface on the second leg, the first and second inner contact surfaces being adjacent one another when the first and second legs are pivoted toward one another to form the proximal aperture and the distal aperture;

the first leg further having a blade with a sharpened edge, the blade being positioned within a recessed portion of the first leg such that the sharpened edge is below the first inner contact surface; and the second leg further having a projection, the projection being configured to abut the sharpened edge of the blade when the first and second legs are pivoted adjacent one another to form the distal aperture.

15. The container opening tool of claim 14, wherein the first and second legs each have distal and proximal ends, the first and second legs pivotally secured to one another at their proximal ends.

16. The container opening tool of claim 15, wherein the blade, recessed portion, and first inner contact surface are each formed proximate the distal end of the first leg, and further wherein the second inner contact surface is formed proximate the distal end of the second leg.

17. The container opening tool of claim 16, further comprising a flange secured to the first outer surface and extending substantially tangentially from the first outer surface to define an interior space between the projection and the first outer surface.

18. The container opening tool of claim 16, further comprising a flange secured to the second outer surface and extending substantially tangentially from the second outer surface to define an interior space between the projection and the second outer surface.

19. The container opening tool of claim 17, wherein the proximal portions have first and second ends, each of the proximal portions comprising a first metal flange secured proximate the first end and projecting away from the aperture wall, the first metal flanges of the proximal portions being adjacent one another when the proximal portions are positioned to form the proximal aperture;

each of the proximal portions further comprising a second metal flange secured proximate the second end of the proximal portion and projecting away from the aperture wall toward the first metal flange, the second metal flanges of the proximal portions being adjacent one another when the proximal portions are positioned to form the proximal aperture, wherein the metal flanges are secured proximate the edge of the aperture walls.

* * * * *